(12) United States Patent
Shioya et al.

(10) Patent No.: US 9,022,573 B2
(45) Date of Patent: May 5, 2015

(54) IMAGE DISPLAY DEVICE AND LIGHT SOURCE COOLING METHOD

(75) Inventors: Yukinori Shioya, Tokyo (JP); Jiro Takami, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 284 days.

(21) Appl. No.: 13/813,640

(22) PCT Filed: Aug. 16, 2010

(86) PCT No.: PCT/JP2010/063806
§ 371 (c)(1),
(2), (4) Date: Jan. 31, 2013

(87) PCT Pub. No.: WO2012/023169
PCT Pub. Date: Feb. 23, 2012

(65) Prior Publication Data
US 2013/0128458 A1 May 23, 2013

(51) Int. Cl.
*G03B 21/16* (2006.01)
*G03B 21/26* (2006.01)
*H01J 17/28* (2006.01)
*H05B 37/02* (2006.01)
*H05B 39/00* (2006.01)
*G02F 1/1333* (2006.01)

(52) U.S. Cl.
CPC .......... *G02F 1/133385* (2013.01); *G03B 21/16* (2013.01)

(58) Field of Classification Search
USPC .............. 353/57, 61, 58, 85; 315/117, 209 R, 315/307, 291; 361/695
See application file for complete search history.

(56) References Cited

U.S. PATENT DOCUMENTS

| 2004/0263797 | A1* | 12/2004 | Russell et al. | 353/57 |
| 2008/0048583 | A1* | 2/2008 | Yamauchi et al. | 315/291 |
| 2008/0316435 | A1* | 12/2008 | Kobayashi | 353/52 |

(Continued)

FOREIGN PATENT DOCUMENTS

| CN | 101119607 A | 2/2008 |
| CN | 101507367 A | 8/2009 |

(Continued)

OTHER PUBLICATIONS

Chinese Office Action dated Sep. 29, 2014 with an English translation thereof.

(Continued)

*Primary Examiner* — Toan Ton
*Assistant Examiner* — Magda Cruz
(74) *Attorney, Agent, or Firm* — McGinn IP Law Group, PLLC

(57) ABSTRACT

An image display device includes a light source; a power supply section that supplies power to light source; a cooling fan that cools the light source; an input section; a drive section that supplies a voltage to cooling fan; a control section that controls drive section and power supply section. The control section sets a first power value for the output of the power supply section and also a first voltage value for the output of the drive section. The control section measures a time at which the light source has been lighted. If the measured value exceeds a threshold, the control section gradually increases the output of the power supply section up to a second power value that is greater than the first voltage value over a predetermined time.

12 Claims, 5 Drawing Sheets

(56) References Cited

U.S. PATENT DOCUMENTS

| | | | |
|---|---|---|---|
| 2010/0164383 A1 | 7/2010 | Munters et al. | |
| 2010/0295473 A1* | 11/2010 | Chemel et al. | 315/294 |
| 2010/0302515 A1* | 12/2010 | Plut | 353/85 |
| 2011/0210680 A1* | 9/2011 | Yamamoto et al. | 315/209 R |

FOREIGN PATENT DOCUMENTS

| | | |
|---|---|---|
| CN | 101646293 A | 2/2010 |
| JP | 2003-295320 A | 10/2003 |
| JP | 2005-182087 A | 7/2005 |
| JP | 2007-059641 A | 3/2007 |
| JP | 2009-129873 A | 6/2009 |
| JP | 2010-500730 A | 1/2010 |
| JP | 2010-178134 A | 8/2010 |

OTHER PUBLICATIONS

International Search Report in PCT/JP2010/063806 dated Sep. 7, 2010(English Translation Thereof).

* cited by examiner

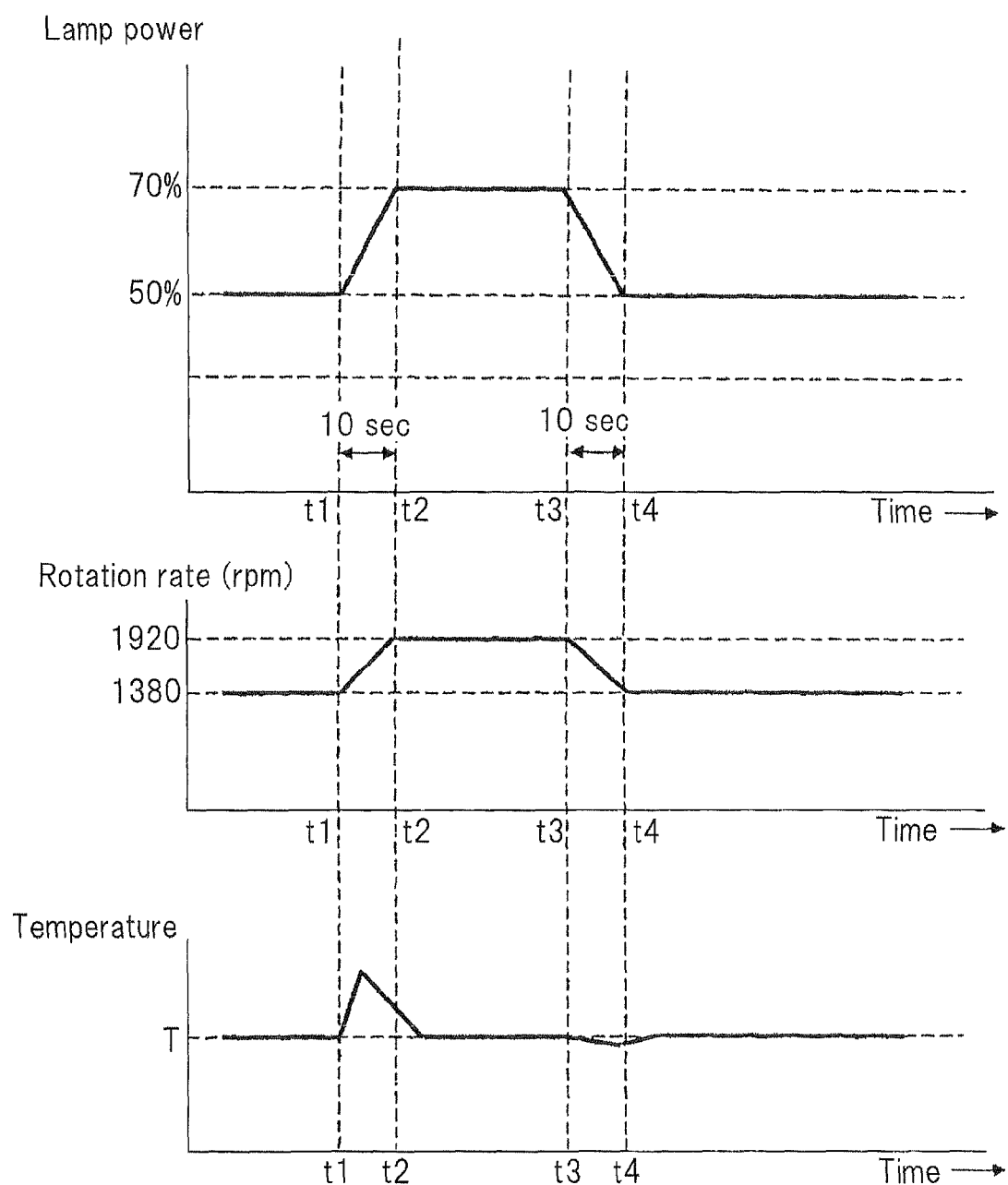

IMAGE DISPLAY DEVICE AND LIGHT SOURCE COOLING METHOD

TECHNICAL FIELD

The present invention relates to an image display device provided with a light source such as a high pressure mercury lamp.

BACKGROUND ART

An image display device such as a liquid crystal display or a projector is provided with a high pressure mercury lamp or the like as a light source. A high pressure mercury lamp is structured such that mercury or gas is confined in a glass tube. Thus, if the temperature of the lamp excessively rises, the glass tube will explode or quartz that composes the glass tube will deform and thereby its permeability will deteriorate. To prevent such situations, image display devices that use a high pressure mercury lamp as a light source are generally provided with a cooling fan that cools the light source.

Some of recent projectors that have a high pressure mercury lamp as a light source are provided with an energy saving mode that allows power supplied to the light source to be decreased to around several ten % of the maximum power (for example, around 50% to 90%). The energy saving mode might be set up for example by pressing a particular button mounted on the projector.

When power supplied to the light source is decreased, although an image that is displayed becomes dark, if the energy saving mode is set up in the following configuration, the image that is displayed can be sufficiently observed.

When an image projected by a projector is observed in the state in which a room lamp is turned on, since the room is bright, if power supplied to the light source is decreased, the image that is projected becomes less visible. By contrast, if the room lamp is turned off, since the room is dark, even if the amount of power supplied to the light source is decreased, brightness sufficient to see the image can be provided. Thus, if the room lamp is turned off, an image that is displayed can be satisfactorily observed even in the energy saving mode.

The smaller is the projection range (projection screen) on the projector the screen, the brighter the displayed image becomes. Thus, when the projection range is small, an image that is displayed can be sufficiently observed even in the energy saving mode.

Generally, the lower the power supplied to the light source, the lower is the temperature of the light source. Since power supplied to the light source in the energy saving mode is less than that in the regular mode in which the light source are lighted with maximum power, the rise of the temperature of the light source can be prevented.

Patent Literature 1 discloses a technique that considers the temperature changes of a light source that occur in the energy saving mode.

Patent Literature 1 discloses a projection type display device having a light source, a sirocco fan, and a duct that guides cooling air from the sirocco fan to the light source. In this projection type display device, when a power saving mode (corresponding to the foregoing energy saving mode) is set up, the amount of airflow supplied from the sirocco fan to the light source is decreased. As a result, the level of noise of the sirocco fan that operates in the power saving mode can be decreased.

RELATED ART LITERATURE

Patent Literature

Patent Literature 1: JP2005-182087A, Publication

SUMMARY OF THE INVENTION

However, the projection type display device described in Patent Literature 1 has the following problems.

When a high pressure mercury lamp is turned on with low power like in the energy saving mode, even if the temperature of the high pressure mercury lamp lies in the optimum temperature range, photo-darkening due to adhesion of mercury to the inner plane of a glass tube gradually progresses over time. Thus, if the projection type display device has been operated in the energy saving mode over a some considerable time, photo-darkening will occur on the inner plane of the glass tube.

In addition, the high pressure mercury lamp has a structure in which a pair of tungsten electrodes are accommodated in a glass tube such that electrode regeneration occurs based on a halogen cycle. In the electrode regeneration, tungsten atoms are emitted from both the electrodes and then emitted tungsten atoms are coupled to halogen atoms that have been injected into the glass tube and thereby halogenated tungsten is formed. Heat convection causes halogenated tungsten to float in the glass tube. Since halogenated tungsten is exposed to a high temperature in the neighborhood of the electrodes, halogenated tungsten is separated into tungsten atoms and halogen atoms. The separated tungsten atoms adhere to the electrodes, resulting in electrode regeneration.

If the high pressure mercury lamp is lighted with the foregoing low power, since the temperature in the neighborhood of the electrodes becomes lower, the foregoing electrode regeneration may not sufficiently occur.

If the amount of power supplied to the light source is increased during execution of the energy saving mode, since the temperature in the neighborhood of the electrodes rises, mercury that adheres to the inner plane of the glass tube can evaporate and be reused such that electrode regeneration occurs.

However, since the amount of airflow is low in the energy saving mode, if the amount of power supplied to the light source is increased in this state, since the temperature of the light source rises, the glass tube may explode and its permeability may deteriorate due to degeneration of quartz that makes up the glass tube.

An object of the present invention is to provide an image display device and a light source cooling method that prevents the occurrence of photo-darkening phenomenon in the energy saving mode and that also prevents the explosion of the glass tube and deterioration of its permeability that occur if power supplied to the light source is increased during the execution of the energy saving mode.

An image display device of the present invention is an image display device that has a light source and that displays an image in which light emitted from the light source has been spatially modulated, comprising:

a power supply section that supplies power to said light source;

a cooling fan that cools said light source;

a drive section that supplies a voltage to said cooling fan;

an input section that accepts an input that designates one of a plurality of lighting modes that differ in power that is supplied to said light source and that outputs a command signal that represents the designated mode;

a control section that controls said drive section to supply the voltage to said cooling fan and said power supply section to supply the power to said light source corresponding to said command signal that is received from said input section, wherein said control section stores a first power value and a first voltage value that are set up in a first lighting mode and also a second power value and a second voltage value that are set up in a second lighting mode, the power corresponding to the first power value being supplied to said light source, the voltage corresponding to the first voltage value being supplied to said cooling fan, the power corresponding to the second power value being supplied to said light source, the voltage corresponding to the second voltage value being supplied to said cooling fan, said second power value being greater than the said first power value, said second voltage being greater than said first voltage value, and wherein when said control section accepts said command signal that represents the designation of said first lighting mode from said input section, said control section sets said first power value for the output of said power supply section and also sets said first voltage value for the output of said drive section, and wherein said control section measures a time at which said light source has been lighted in said first lighting mode, and if the measured value exceeds a threshold, said control section gradually increases the output of said power supply section up to said second power value over a predetermined time, and said control section increases the output of said drive section up to said second voltage value before the output of said power supply section has become said second power value.

A light source cooling method of the present invention is a light source cooling method for an image display device that includes: a light source; a power supply section that supplies power to the light source; a cooling fan that cools said light source; and a drive section that supplies a voltage to said cooling fan, and that displays an image in which light emitted from the light source has been spatially modulated, said light source cooling method comprising:

setting a first power value that has been preset for the output of said power supply section and also a first voltage value that has been preset for the output of said drive section;

measuring a time for which said light source has been lighted with said first power value, and if the measured value exceeds a threshold, gradually increasing the output of said power supply section up to a second power value that is greater than said first voltage value over a predetermined time, and increasing the output of said drive section up to a second voltage value that has been preset and that is greater than said first voltage value before the output of said power supply section has become said second power value; and measuring a time at which said light source has been lighted with said second power value, and if the measured value exceeds another threshold, gradually increasing the output of said power supply section up to said second power value, and increasing the output of said drive section up to said second voltage value before the output of said power supply section has become said second power value.

BRIEF DESCRIPTION OF DRAWINGS

FIG. 6 shows graphs describing the timings of a lamp power control and a fan rotation control that an image display device according to a comparative example performs and the changes of the temperature of the lamp based on these controls.

DESCRIPTION OF REFERENCE NUMERALS

Figure 1:
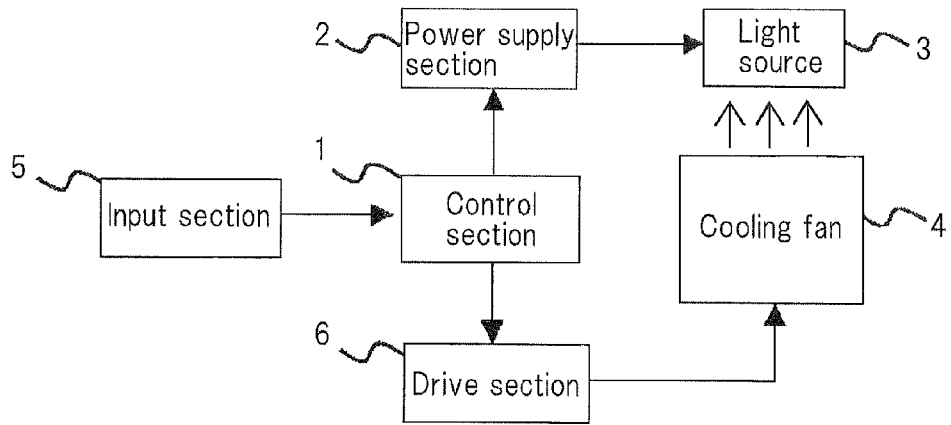
FIG. 1 is a block diagram showing the structure of an image display device according to a first embodiment of the present invention.

1 Control section
2 Power supply section
3 Light source
4 Cooling fan
5 Input section
6 Drive section

BEST MODES THAT CARRY OUT THE INVENTION

Next, with reference to the accompanying drawings, embodiments of the present invention will be described.

First Embodiment

FIG. 1 is a block diagram showing the structure of an image display device according to a first embodiment of the present invention.

The image display device shown in FIG. 1 is an image display device that has a high pressure mercury lamp or the like as light source 3 and that displays an image in which light emitted from light source 3 has been spatially modulated. The image display device has control section 1, power supply section 2, light source 3, cooling fan 4, input section 5, and drive section 6.

Power supply section 2 supplies power to light source 3. Cooling fan 4 cools light source 3. Drive section 6 supplies a voltage to cooling fan 4.

Input section 5 has a plurality of buttons. The user can designate any one of a plurality of lighting modes using at least one of these buttons. The plurality of lighting modes include a regular mode in which the output of power supply section 2 is the maximum power value and an energy saving mode in which the output of power supply section 2 is a power value that is less than the maximum power value. The energy saving mode includes controls of first and second lighting modes. When input section 5 accepts an input that designates a lighting mode, input section 5 outputs a command signal that represents the designated lighting mode.

Control section 1 controls drive section 6 to supply a voltage to cooling fan 4 and also power supply section 2 to supply power to light source 3 corresponding to a command signal that is received from input section 5.

Control section 1 stores a first power value and a first voltage value that are set up in the first lighting mode and also a second power value and a second voltage value that are set up in the second lighting mode, the second power value being greater than the first power value, the second voltage value being greater than the first voltage value. The first power value is for example 50% of the maximum power. The second power value is, for example, 70% of the maximum power. Thus, each of the first power value and the second power value is less than the maximum value.

When control section 1 accepts a command signal that represents the designation of the first lighting mode from input section 5, control section 1 sets the first power value for the output of power supply section 2 and also the first voltage value for the output of drive section 6.

Control section 1 measures the time for which light source 3 has lighted in the first lighting mode. If the measured value exceeds a first threshold, control section 1 gradually increases the output of power supply section 2 up to the second power value over a predetermined time. In addition, control section 1 increases the output of drive section 6 up to the second voltage value before the output of power supply section 2 has become the second power value. In this example, the predetermined time is for example 10 seconds. If the output of power supply section 2 is suddenly increased from the first power value to the second power value, since the luminous intensity of the screen suddenly increases, it would cause the observer of the image to feel uncomfortable.

The first threshold is for example 10 minutes. The second power value causes mercury that adheres to the inner plane of the glass tube of light source 3 to be evaporated and reused such that electrode regeneration occurs. The second voltage value causes explosion of the glass tube and deterioration of its permeability due to denaturation of quartz that is to be presented in the second lighting mode.

Control section 1 measures the time at which light source 3 has been lighted in the second lighting mode. If the measured value exceeds a second threshold, control section 1 gradually decreases the output of power supply section 2 up to the first power value over a predetermined time. In addition, control section 1 decreases the output of drive section 6 up to the first voltage value after the output of power supply section 2 has become the first power value. The second threshold is, for example, one minute. Control section 1 decreases the second power value up to the first power value over a predetermined time due to the same reason as control section 1 increase power.

When control section 1 accepts a command signal that represents the designation of the regular mode from input section 5, control section 1 causes power supply section 2 to supply the maximum power to light source 3. In the regular mode, control section 1 sets a third voltage value that is greater than the second voltage value for the output of drive section 6.

Next, a light source cooling method for the image display device according to this embodiment performs will be described.

Figure 2:
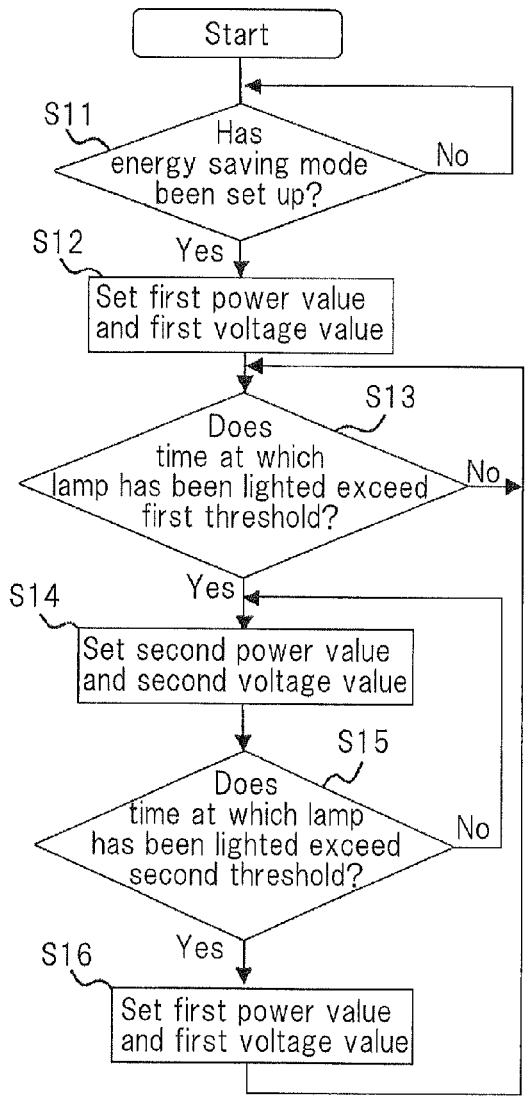
FIG. 2 is a flow chart showing a procedure for lamp/fan controls that the image display device shown in FIG. 1 performs.

FIG. 2 is a flow chart showing a procedure for lamp/fan controls that image display device according to this embodiment performs.

When control section 1 accepts the command signal that represents the designation of the first lighting mode from input section 5, control section 1 sets the first power value for the output of power supply section 2 and also sets the first voltage value for the output of drive section 6 (at steps S11 and S12).

Thereafter, control section 1 measures the time at which light source 3 has been lighted in the first lighting mode and determines whether or not the measured value exceeds the first threshold (at step S13).

If control section 1 determines that the measured value exceeds the first threshold at step S13, control section 1 increases the output of power supply section 2 from the first power value to the second power value. In addition, control section 1 increases the output of drive section 6 to the second voltage value before the output of power supply section 2 has become the second power value (at step S14). The operation at step S14 is a refresh operation and corresponds to the second lighting mode.

Thereafter, control section 1 measures the time at which light source 3 has been lighted in the second lighting mode and determines whether the measured value exceeds the second threshold (at step S15).

If control section 1 determines that the measured value exceeds the second threshold at step S15, control section 1 decreases the output of power supply section 2 up to the first power value. In addition, control section 1 decreases the output of drive section 6 up to the first voltage value after the output of power supply section 2 has become the first power value (at step S16). Thereafter, flow returns to step S13.

Control section 1 can periodically execute the second lighting mode during execution of the first lighting mode.

In the foregoing lamp/fan controls, if light source 3 has been lighted in the first lighting mode over a predetermined time, control section 1 increases the output of power supply section 2 from the first power value to the second power value. As the power is increased, since the temperature in the neighborhood of the electrodes of light source 3 rises, mercury that adheres to the inner plane of the glass tube can evaporate and be reused such that electrodes regeneration occurs.

When light source 3 switches from the first lighting mode to the second lighting mode, control section 1 increases the output of drive section 6 up to the second voltage value before the output of power supply section 2 has become the second power value. In this case, the amount of airflow supplied from cooling fan 4 to light source 3 becomes the amount of airflow that is required when light source 3 is lighted in the second lighting mode before light source 3 has switched to the second lighting mode (the amount of airflow that can prevent the explosion of glass tube and deterioration of its permeability). Thus, when light source 3 switches to the second lighting mode, explosion of the glass tube and deterioration of its permeability due to the rise of the temperature of light source 3 can be securely prevented.

In the structure that, when the output of power supply section 2 becomes the second power value, the second voltage value is set for the output of drive section 6, the output of drive section 6 is maintained at the first voltage value until the output of power supply section 2 has become the second power value. Thus, the amount of airflow that is required to sufficiently cool light source 3 cannot be obtained until light source 3 has switched to the second lighting mode. Thus, since the temperature of light source 3 may excessively rise, the glass tube may explode and its permeability may deteriorate.

Second Embodiment

Figure 3:
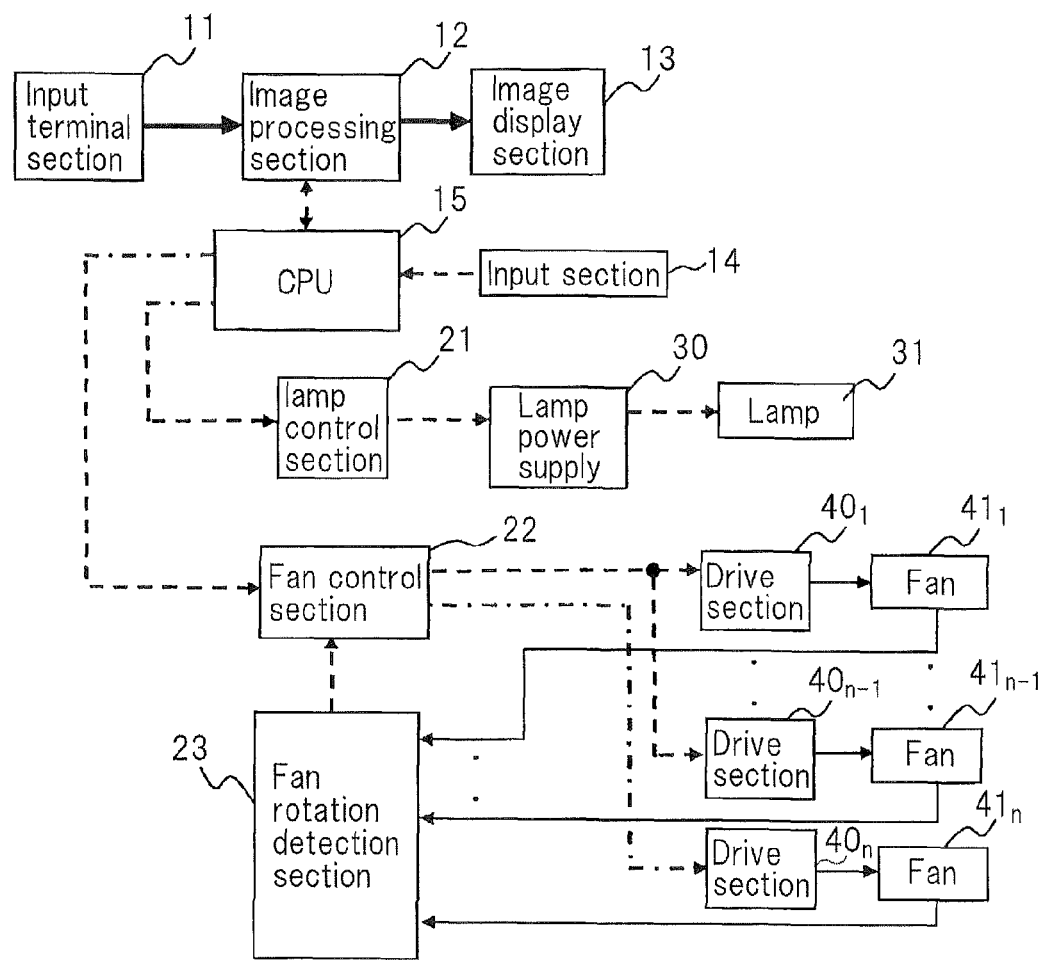
FIG. 3 is a block diagram showing the structure of an image display device according to a second embodiment of the present invention.

FIG. 3 is a block diagram showing the structure of an image display device according to a second embodiment of the present invention.

Referring to FIG. 3, the image display device has input terminal section 11, image processing section 12, image display section 13, input section 14, CPU (Central Processing Unit) 15, lamp control section 21, fan control section 22, fan rotation detection section 23, lamp power supply 30, lamp 31, drive sections 40$_1$ to 40$_n$, and fans 41$_1$ to 41$_n$.

Lamp 31 is a high pressure mercury lamp or the like. Lamp power supply 30 supplies power to lamp 31. Lamp control section 21 controls lamp power supply 30 to supply power to lamp 31 corresponding to a lamp control signal that is received from CPU 15. Specifically, lamp control section 21 outputs an ON/OFF signal that is a power supply control signal and a power designation signal that represents a power value.

An image signal is supplied from an external image supply unit to image processing section 12 through input terminal section 11. The external image supply unit is, for example, an information processing unit such as a personal computer.

Image processing section 12 performs a process in which image display section 13 needs to display an image corresponding to an image signal supplied from input terminal section 11. Image display section 13 has a display element with which light emitted from light source 3 is irradiated; and a projection section that projects an image generated by the display element. The display element is, for example, a liquid crystal panel or a DMD.

Fans $41_1$ to $41_n$ each change the rotation rate corresponding to the input voltage and output a rotation signal that represents the rotation rate. Fan $41_n$ cools lamp 31. Remaining fans $41_1$ to $41_{n-1}$ are, for example, an air exhaust fan, an air intake fan, and so forth. The air exhaust fan and air intake fan are mounted on an enclosure that accommodates image processing section 12, image display section 13, CPU 15, lamp control section 21, fan control section 22, fan rotation detection section 23, lamp power supply 30, lamp 31, drive sections $40_1$ to $40_n$, and so forth.

Drive sections $40_1$ to $40_n$ are provided corresponding to fans $41_1$ to $41_n$. Drive sections $40_1$ to $40_{n-1}$ supply voltages to fans $41_1$ to $41_{n-1}$, respectively, corresponding to a first voltage control signal that is received from fan control section 22. Drive section $40_n$ supplies a voltage to fan $41_n$ corresponding to a second voltage control signal that is received from fan control section 22. In other words, a control system for fans $41_1$ to $41_{n-1}$ is independent from that for fan $41_n$.

Fan control section 22 supplies the first voltage control signal to each of drive sections $40_1$ to $40_{n-1}$ and the second voltage control signal to drive section $40_n$ corresponding to a fan control signal that is received from CPU 15.

The rotation signals that are output from fans $41_1$ to $41_n$ are supplied to fan rotation detection section 23. Fan rotation detection section 23 detects the rotation rates of fans $41_1$ to $41_n$ corresponding to the rotation signals that are output therefrom and supplies the detected results to fan control section 22.

Fan control section 22 increases or decreases the output of drive section $40_n$ such that the rotation rate of fan $41_n$ that is supplied from fan rotation detection section 23 becomes the rotation rate corresponding to the fan control signal that is received from CPU 15.

In addition, fan control section 22 increases or decreases the outputs of drive sections $40_1$ to $40_{n-1}$ such that the average value of the rotation rates of fans $41_1$ to $41_{n-1}$ or the rotation rate of any one of fans $41_1$ to $44_{n-1}$ becomes the rotation rate corresponding to the fan control signal that is received from CPU 15.

Although the rotation rates of fans $41_1$ to $41_{n-1}$ are uniformly controlled, the rotation rate of fan $41_n$ is controlled independent from those of fans $41_1$ to $41_{n-1}$.

Input section 5 has a plurality of buttons. The user can perform an input operation using at least one of these buttons so as to designate any one of a plurality of lighting modes. The plurality of lighting modes include a regular mode in which the output of lamp power supply 30 is the maximum power value and an energy saving mode in which the output of lamp power supply 30 is a power value that is less than the maximum power value. When input section 5 accepts an input that designates a lighting mode, input section 5 outputs a command signal that represents the designated lighting mode.

The energy saving mode includes a 50% lighting mode and a 70% lighting mode. In the 50% lighting mode, the output of lamp power supply 30 is the first power value. In the 70% lighting mode, the output of lamp power supply 30 is the second power value. The first power value is 50% of the maximum power. The second power value is 70% of the maximum power.

CPU 15 controls drive sections $40_1$ to $40_n$ to supply voltages to fans $41_1$ to $41_n$ through fan control section 22 and lamp power supply 30 to supply power to lamp 31 through lamp control section 22 corresponding to a command signal that is received from input section 14.

When CPU 15 accepts a command signal that represents the designation of the energy saving mode from input section 14, CPU 15 supplies a lamp control signal to lamp control section 21 so as to set the first power value for the output of lamp power supply 30. In addition, CPU 15 supplies a fan control signal to fan control section 22 so as to set a first rotation rate (for example, 1380 rpm) for the rotation rate of fan $41_n$.

CPU 15 measures the time at which lamp 31 has been lighted in the first lighting mode in which the output of lamp power supply 30 is the first power value. If the measured value exceeds a first threshold, CPU 15 supplies a lamp control signal to lamp control section 21 so as to set the second power value for the output of lamp power supply 30. In addition, CPU 15 supplies a fan control signal to fan control section 22 so as to set the second rotation rate (for example, 1920 rpm) for the rotation rate of fan $41_n$.

CPU 15 measures the time at which light source 3 has been lighted in the second lighting mode in which the output of lamp power supply 30 is the second power value. If the measured value exceeds a second threshold, CPU 15 supplies a lamp control signal to lamp control section 21 so as to set the first power value for the output of lamp power supply 30. In addition, CPU 15 supplies a fan control signal to fan control section 22 so as to set the first rotation rate (for example, 1380 rpm) for the rotation rate of fan $41_n$.

In the energy saving mode, CPU 15 supplies a fan control signal to fan control section 22 so as to set the second rotation rate (for example, 1920 rpm) for the rotation rate of each of fans $41_1$ to $41_{n-1}$.

Next, the operation for the image display device according to this embodiment will be specifically described.

Figure 4:
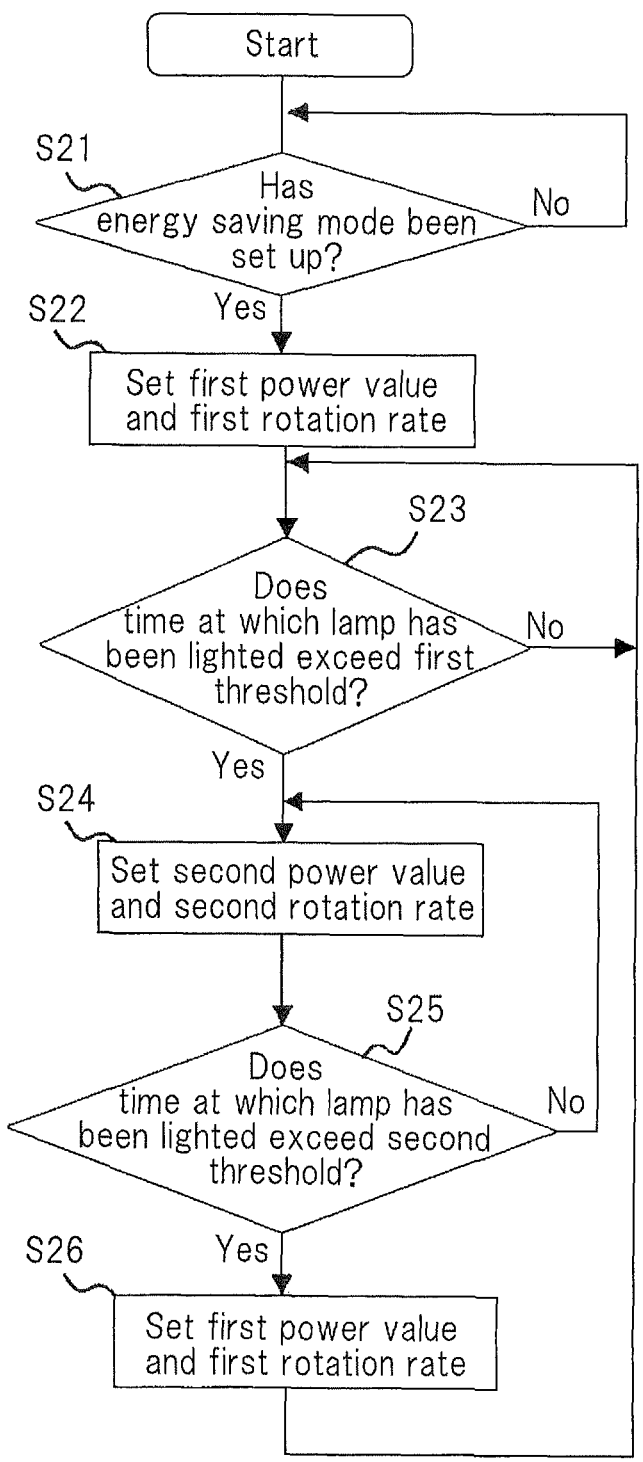
FIG. 4 is a flow chart describing a procedure for lamp/fan controls that the image display device shown in FIG. 3 performs.

FIG. 4 is a flow chart describing a procedure for lamp/fan controls. In this example, the rotation rate of each of fans $41_1$ to $41_n$ is fixed to the second rotation rate (for example, 1920 rpm). Only the rotation rate of fan $41_n$ is controlled.

CPU 15 determines whether or not the energy saving mode has been designated corresponding to a command signal that is received from input section 14 (at step S21).

If CPU 15 determines that the energy saving mode has been designated at step S21, CPU 15 supplies a lamp control signal to lamp control section 21 so as to set the first power value for the output of lamp power supply 30. In addition, CPU 15 supplies a fan control signal to fan control section 22 so as to set the first rotation rate (for example, 1380 rpm) for the rotation rate of fan $41_n$ (at step S22).

At step S22, lamp control section 21 sets the first power value for the output of lamp power supply 30 corresponding to the lamp control signal that is received from CPU 15. In addition, fan control section 22 increases or decreases the output of drive section $40_1$ corresponding to the fan control signal that is received from CPU 15 such that the rotation rate of fan $41_n$ supplied from fan rotation detection section 23 becomes the first rotation rate. This operation causes light source 3 to light in the first lighting mode.

Thereafter, CPU 15 measures the time at which lamp 31 has been lighted in the first lighting mode and determines whether or not the measured value exceeds the first threshold (10 minutes) (at step S23).

If the measured value exceeds the first threshold (10 minutes) at step S23, CPU 15 supplies a lamp control signal to lamp control section 21 so as to set the second power value for the output of lamp power supply 30. In addition, CPU 15 supplies a fan control signal to fan control section 22 so as to set the second rotation rate (for example, 1920 rpm) for the rotation rate of fan $41_n$ before the output of lamp power supply 30 has become the second power value (at step S24).

At step S24, lamp control section 21 sets the second power value for the output of lamp power supply 30 corresponding to the lamp control signal that is received from CPU 15. In addition, fan control section 22 increases or decreases the output of drive section $40_n$ corresponding to the fan control signal that is received from CPU 15 such that the rotation rate of fan $41_n$ supplied from fan rotation detection section 23 becomes the second rotation rate before the output of lamp power supply 30 has become the second power value. This operation causes light source 3 to light in the second lighting mode.

Thereafter, CPU 15 measures the time at which lamp 31 has been lighted in the second lighting mode and determines whether or not the measured value exceeds the second threshold (1 minute) (at step S25).

If the measured value exceeds the second threshold (1 minute) at step S24, CPU 15 supplies a lamp control signal to lamp control section 21 so as to set the first power value for the output of lamp power supply 30. In addition, CPU 15 supplies a fan control signal to fan control section 22 so as to set the first rotation rate (for example, 1380 rpm) for the rotation rate of fan $41_n$ after the output of lamp power supply 30 has become the first power value (at step S26).

At step S26, lamp control section 21 sets the first power value for the output of lamp power supply 30 corresponding to the lamp control signal that is received from CPU 15. In addition, fan control section 22 increases or decreases the output of drive section $40_n$ corresponding to the fan control signal that is received from lamp power supply 30 such that the rotation rate of fan $41_n$ becomes the first rotation rate before the output of lamp power supply 30 has becomes the first power value. This operation causes light source 3 to light in the first lighting mode.

The foregoing procedure for the lamp/fan controls can provide the same effects as the first embodiment.

Next, specific effects of the present invention will be described compared with a comparative example.

Figure 5:
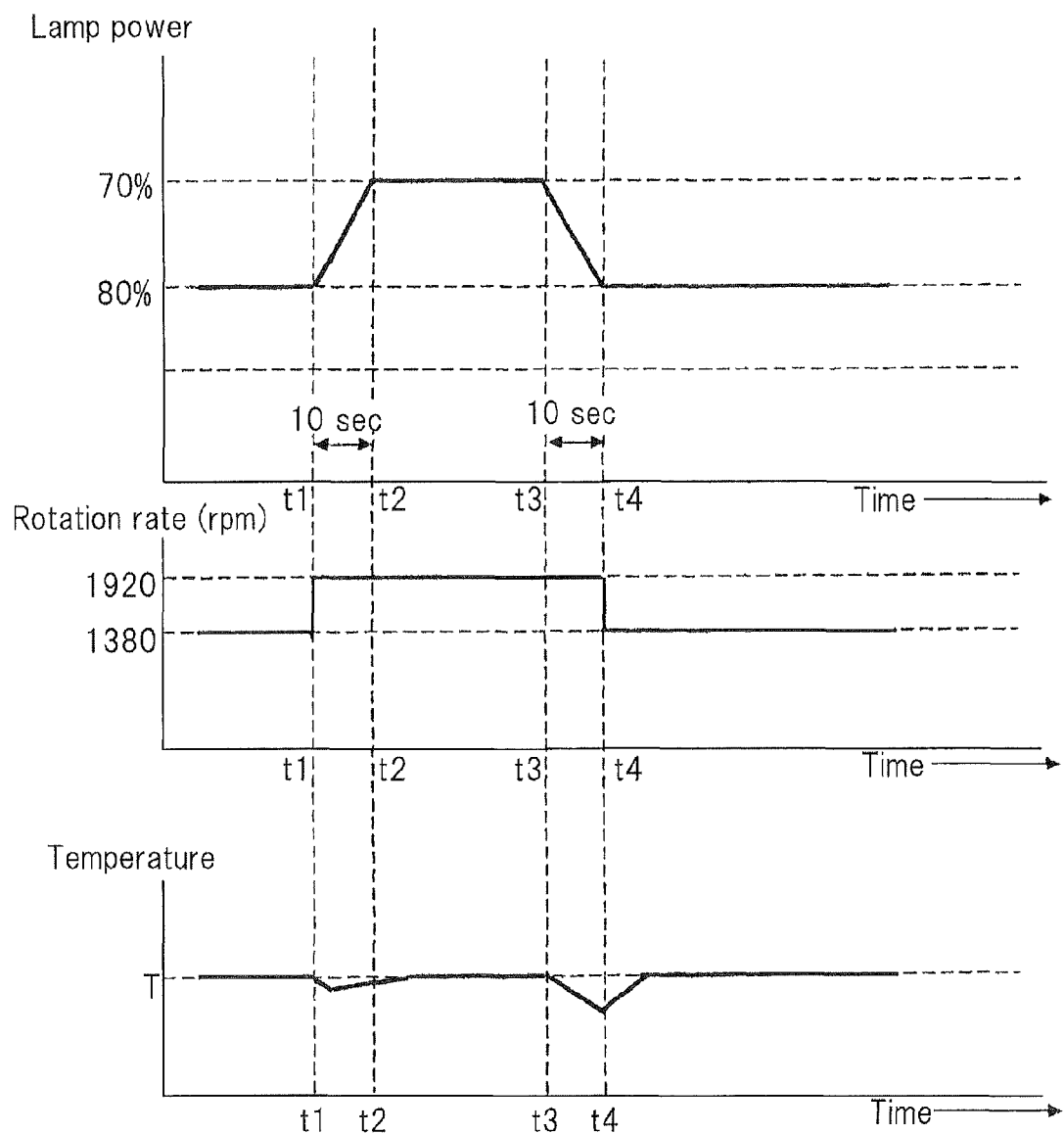
FIG. 5 shows graphs describing the timings of the lamp power control and the fan rotation control that the image display device shown in FIG. 3 performs and the changes of the temperature of the lamp based on these controls.

FIG. 5 shows graphs describing the timings of lamp power control and fan rotation control that the image display device according to this embodiment performs and changes of the temperature of the lamp based on these controls. In FIG. 5, an upper graph is a timing chart of the lamp power control; a middle graph is a timing chart of the fan rotation control; and a lower graph shows the changes of the temperature of the lamp.

As shown in FIG. 5, the output of lamp power supply 30 is 50% of the maximum power until time t1. The output of lamp power supply 30 increases from 50% of the maximum power to 70% thereof in the period after time t1 until time t2. The output of lamp power supply 30 is maintained at 70% of the maximum power after time t2 until time t3. The output of lamp power supply 30 decreases from 70% of the maximum power to 50% thereof in the period after time t3 until time t4. The output of lamp power supply 30 is maintained at 50% of the maximum power after time t4.

The rotation rate of fan 41, changes from 1380 rpm to 1920 rpm at time t1. The rotation rate of fan $41_n$ is maintained at 1920 rpm after time t1 until time t4. The rotation rate of fan $41_n$ changes from 1920 rpm to 1380 rpm at time t4. Thereafter, the rotation rate of fan $41_n$ is maintained at 1380 rpm.

The temperature of lamp 30 is maintained at optimum temperature T until time t. The temperature of lamp 30 gradually becomes lower after time t1. Thereafter, the temperature of lamp 30 rises. The temperature of lamp 30 becomes optimum temperature T after time t2. The temperature of lamp 30 slightly becomes lower after time t1. The temperature of lamp 30 gradually becomes lower after time t3. The temperature of lamp 30 gradually rises after t4. Thereafter, the temperature of lamp 30 becomes optimum temperature T. The temperature of lamp 30 slightly becomes lower in the period after time t3 until time t4. Thus, in any of the first lighting mode and the second lighting mode, since the temperature of lamp 30 is maintained nearly at optimum temperature T, explosion of the glass tube and deterioration of its permeability do not occur.

When the output of lamp power supply 30 is increased to 70% of the maximum power, mercury that adheres to the inner plane of the glass tube can evaporate and be reused such that electrodes regeneration occurs.

FIG. 6 shows graphs describing the timings of a lamp power control and a fan rotation control that an image display device according to a comparative example performs and changes of the temperature of the lamp based on these controls. In FIG. 6, an upper graph is a timing chart of the lamp power control; a middle graph is a timing chart of the fan rotation control; and a lower graph shows the changes of the temperature of the lamp.

The lamp power control for the comparative example is the same as that shown in FIG. 5.

In the fan rotation control of the comparative example, the rotation rate of the fan gradually changes from 1380 rpm to 1920 rpm in the period after time t1 until time t2. The rotation rate of the fan is maintained at 1920 rpm after time t1 until time t4. The rotation rate of the fan gradually changes from 1920 rpm to 1380 rpm in the period after time t3 until time t4. Thereafter, the rotation rate of the fan is maintained at 1380 rpm.

The temperature of the lamp is maintained at optimum temperature T until time t. The temperature of the lamp suddenly rises after time t1. Thereafter, the temperature of the lamp becomes lower. The temperature of the lamp becomes optimum temperature T after time t2. The temperature largely rises after time t1. The temperature of the lamp gradually becomes lower after time t3. The temperature of the lamp rises after time t4. Thereafter, the temperature of the lamp becomes optimum temperature T. The temperature of the lamp slightly becomes lower in the period after time t3 until time t4. Thus, when the lamp switches from the first lighting mode to the second lighting mode, since the temperature of the lamp suddenly rises, the explosion of the glass tube and the deterioration of its permeability may occur.

When the rotation rate of the fan is gradually changed from 1380 rpm to 1920 rpm in the foregoing comparative example, a lookup table that stores data corresponding to the changes (data that correlate the rotation rates and voltage values) is prepared. With reference to the lookup table, the output of the drive section is changed. Likewise, when the rotation rate of the fan is gradually changed from 1920 rpm to 1380 rpm, the drive section is controlled based on the lookup table that stores data corresponding to the changes.

By contrast, in the image display device according to this embodiment, the rotation rate of the fan is changed from 1380 rpm to 1920 rpm or from 1920 rpm to 1380 rpm. Since this operation does not require control based on such a lookup table, the structure and control for the device can be more simplified than in the comparative example.

With reference to the embodiments, the present invention has been described. However, it should be understood by those skilled in the art that the structure and operation of the present invention may be changed in various manners without departing from the scope of the present invention.

For example, in the first embodiment, when control section 1 accepts a command signal that represents the designation of the regular mode from input section 5 so as to supply the maximum power to light source 3 while light source 3 is been lighted, control section 1 may cause the output of power supply section 2 to be increased to the maximum power value and the output of drive section 6 to be increased to a third voltage value that is greater than the second voltage value before the output of power supply section 2 has become the maximum power value. The same control may be applied to the image display device according to the second embodiment.

The present invention can be applied to image display devices of all types that have a high pressure mercury lamp or the like as a light source and spatially modulate light emitted from the light source so as to display an image. Specifically, the present invention can be applied to liquid crystal displays and projectors.

The invention claimed is:

1. An image display device that has a light source and that displays an image in which light emitted from the light source has been spatially modulated, comprising:
    a power supply section that supplies power to said light source;
    a cooling fan that cools said light source;
    a drive section that supplies a voltage to said cooling fan;
    an input section that accepts an input that designates one of a plurality of lighting modes that differ in power that is supplied to said light source and that outputs a command signal that represents the designated mode;
    a control section that controls said drive section to supply the voltage to said cooling fan and said power supply section to supply the power to said light source corresponding to said command signal that is received from said input section,
    wherein said control section stores a first power value and a first voltage value that are set up in a first lighting mode and also a second power value and a second voltage value that are set up in a second lighting mode, the power corresponding to the first power value being supplied to said light source, the voltage corresponding to the first voltage value being supplied to said cooling fan, the power corresponding to the second power value being supplied to said light source, the voltage corresponding to the second voltage value being supplied to said cooling fan, said second power value being greater than the said first power value, said second voltage value being greater than said first voltage value, and
    wherein when said control section accepts said command signal that represents the designation of said first lighting mode from said input section, said control section sets said first power value for the output of said power supply section and also sets said first voltage value for the output of said drive section, and
    wherein said control section measures a time at which said light source has been lighted in said first lighting mode, and if the measured value exceeds a threshold, said control section gradually increases the output of said power supply section up to said second power value over a predetermined time, and said control section increases the output of said drive section up to said second voltage value before the output of said power supply section has become said second power value.

2. The image display device according to claim 1,
    wherein said control section measures a time at which said light source has been lighted in said second lighting mode, and if the measured value exceeds another threshold, said control section gradually decreases the output of said power supply section up to said first power value over a predetermined time, and said control section decreases the output of said drive section up to said first voltage value after the output of said power supply section has become said first power value.

3. The image display device according to claim 2,
    wherein said control section executes said second lighting mode at intervals of a predetermined time while said control section is executing said first lighting mode.

4. The image display device according to claim 2, further comprising:
    a plurality of other fans that are different from said cooling fan; and
    a plurality of other drive sections that supply voltages to said plurality of other fans,
    wherein when said control section accepts said command signal that represents the designation of said first lighting mode, said control section sets said second voltage value for the output of said plurality of other drive sections.

5. The image display device according to claim 2,
    wherein when said control section accepts said control signal that represents the designation of a regular mode in which the maximum power is supplied to said light source from said input section while said light source is being lighted in said first lighting mode, said control section increases the output of said power supply section up to the maximum power value and increases the output of said drive section up to a third voltage value that is greater than said second voltage value before the output of said power supply section has become said maximum power value.

6. The image display device according to claim 1,
    wherein said control section executes said second lighting mode at intervals of a predetermined time while said control section is executing said first lighting mode.

7. The image display device according to claim 6, further comprising:
    a plurality of other fans that are different from said cooling fan; and
    a plurality of other drive sections that supply voltages to said plurality of other fans,
    wherein when said control section accepts said command signal that represents the designation of said first lighting mode, said control section sets said second voltage value for the output of said plurality of other drive sections.

8. The image display device according to claim 6,
    wherein when said control section accepts said control signal that represents the designation of a regular mode in which the maximum power is supplied to said light source from said input section while said light source is being lighted in said first lighting mode, said control section increases the output of said power supply section up to the maximum power value and increases the output of said drive section up to a third voltage value that is greater than said second voltage value before the output of said power supply section has become said maximum power value.

9. The image display device according to claim 1, further comprising:
a plurality of other fans that are different from said cooling fan; and
a plurality of other drive sections that supply voltages to said plurality of other fans,
wherein when said control section accepts said command signal that represents the designation of said first lighting mode, said control section sets said second voltage value for the output of said plurality of other drive sections.

10. The image display device according to claim 9,
wherein when said control section accepts said control signal that represents the designation of a regular mode in which the maximum power is supplied to said light source from said input section while said light source is being lighted in said first lighting mode, said control section increases the output of said power supply section up to the maximum power value and increases the output of said drive section up to a third voltage value that is greater than said second voltage value before the output of said power supply section has become said maximum power value.

11. The image display device according to claim 1,
wherein when said control section accepts said control signal that represents the designation of a regular mode in which the maximum power is supplied to said light source from said input section while said light source is being lighted in said first lighting mode, said control section increases the output of said power supply section up to the maximum power value and increases the output of said drive section up to a third voltage value that is greater than said second voltage value before the output of said power supply section has become said maximum power value.

12. A light source cooling method for an image display device that has a light source; a power supply section that supplies power to the light source; a cooling fan that cools said light source; and a drive section that supplies a voltage to said cooling fan, and that displays an image in which light emitted from the light source has been spatially modulated, said light source cooling method comprising:
setting a first power value that has been preset for the output of said power supply section and also a first voltage value that has been preset for the output of said drive section;
measuring a time at which said light source has been lighted with said first power value, and if the measured value exceeds a threshold, gradually increasing the output of said power supply section up to a second power value that is greater than said first voltage value over a predetermined time, and increasing the output of said drive section up to a second voltage value that has been preset and that is greater than said first voltage value before the output of said power supply section has become said second power value; and
measuring a time at which said light source has been lighted with said second power value, if the measured value exceeds another threshold, gradually decreasing the output of said power supply section up to said first power value over a predetermined time, and decreasing the output of said drive section up to said first voltage value after the output of said power supply section has become said first power value.

\* \* \* \* \*